United States Patent [19]
Nakano

[11] Patent Number: 5,052,236
[45] Date of Patent: Oct. 1, 1991

[54] FORWARD AND REVERSE HYDRAULIC CONTROL FOR TOROIDAL CONTINUOUSLY VARIABLE TRANSMISSION

[75] Inventor: Masaki Nakano, Kawasaki, Japan

[73] Assignee: Nissan Motor Co., Ltd., Yokohama, Japan

[21] Appl. No.: 448,194

[22] Filed: Dec. 14, 1989

[30] Foreign Application Priority Data

Dec. 16, 1988 [JP] Japan .................... 63-318107

[51] Int. Cl.⁵ ............................ E16H 15/38
[52] U.S. Cl. .................... 74/200; 74/190.5
[58] Field of Search ........ 74/200, 201, 190.5, 74/868; 475/35, 115, 186, 192

[56] References Cited

U.S. PATENT DOCUMENTS

| | | | |
|---|---|---|---|
| 1,978,439 | 10/1934 | Sharpe | 74/34 |
| 1,985,110 | 12/1934 | Sharpe | 74/281 |
| 2,030,203 | 2/1936 | Gove et al. | 74/200 |
| 2,045,558 | 6/1936 | Almen et al. | 74/200 |
| 3,684,065 | 8/1972 | Scherter | 475/186 X |
| 4,386,536 | 6/1983 | Kraus | 74/200 |
| 4,434,675 | 3/1984 | Kraus | 74/200 |
| 4,466,312 | 8/1984 | Oguma | 74/868 |
| 4,480,504 | 11/1984 | Oguma | 74/868 |
| 4,524,641 | 6/1985 | Greenwood | 74/200 |
| 4,662,248 | 5/1987 | Greenwood | 74/868 X |
| 4,885,949 | 12/1989 | Barber, Jr. | 74/200 X |
| 4,905,529 | 3/1990 | Nakano | 74/201 |
| 4,909,092 | 3/1990 | Machida et al. | 74/200 |
| 4,928,542 | 5/1990 | Nakano | 74/200 |
| 4,944,201 | 7/1990 | Iino et al. | 74/868 |
| 4,968,289 | 11/1990 | Nakano | 74/200 X |

FOREIGN PATENT DOCUMENTS

| | | |
|---|---|---|
| 581107 | 7/1933 | Fed. Rep. of Germany . |
| 2733764 | 2/1978 | Fed. Rep. of Germany . |
| 1275997 | 10/1961 | France . |
| 0119864 | 6/1986 | Japan .................... 74/200 |
| 62-255652 | 11/1987 | Japan . |
| 63-92859 | 6/1988 | Japan . |
| 63-130954 | 6/1988 | Japan . |
| 435893 | 10/1935 | United Kingdom . |
| 2018894 | 10/1979 | United Kingdom . |
| 2023753 | 1/1980 | United Kingdom . |
| 2161873 | 1/1986 | United Kingdom ......... 475/186 |

*Primary Examiner*—Allan D. Herrmann
*Assistant Examiner*—Khoi Q. Ta
*Attorney, Agent, or Firm*—Foley & Lardner

[57] ABSTRACT

A toroidal type transmission system includes a toroidal transmission mechanism, an actuator for continuously vary a transmission ratio by varying the angle of inclination of power rollers of the toroidal transmission mechanism, a forward-reverse changeover mechanism provided on the input side of the transmission mechanism for changing the direction of input rotation inputted to the toroidal transmission mechanism, a first control valve for controlling a fluid pressure supplied to the actuator only when the input rotation is in the forward direction, a second control valve for controling a fluid pressure supplied to the actuator only when the input rotation is in the reverse direction, a reverse detecting means for detecting the direction of the input rotation, and a selector valve for selecting the first or second control valve in dependence on the direction of rotation detected by the detecting means.

8 Claims, 3 Drawing Sheets

FORWARD AND REVERSE HYDRAULIC CONTROL FOR TOROIDAL CONTINUOUSLY VARIABLE TRANSMISSION

REFERENCES TO RELATED APPLICATIONS

The following, commonly assigned, U.S. Patent Applications relate to subject matter similar to that of the present application. (1) Ser. NO. 07/313,418; filed Feb. 22, 1989. (2) Ser. No. 07/314,846; filed Feb. 24, 1989. (3) Ser. No. 07/316,944; filed Feb. 28, 1989. (4) Ser. No. 07/352,309; filed May 16, 1989. (5) Ser. No. 07/357,192; filed May 26, 1989. (6) Ser. No. 07/450,303, based on Japanese Patent Application No. 63-318104 (Our ref. U151-89). (7) Ser. No. 07/450,326, based on Japanese Patent Application No. 63-318106 (Our ref. U152-89). (8) Ser. No. 07/476,580, based on Japanese Patent Application No. 1-82423 (Our ref. U170-89).

BACKGROUND OF THE INVENTION

The present invention relates to a toroidal type continuously variable transmission.

Japanese Utility Model Provisional Publication No. 63-92859 shows a conventional transmission of such a type. This transmission has input and output cone discs forming a toroidal cavity therebetween, and power rollers installed in the toroidal cavity so as to transmit torque from the input disc to the output disc. One or more actuators are provided to incline the power rollers to continuously vary a transmission ratio.

This conventional transmission is mounted on a vehicle, and the output disc is connected to a forward-reverse changeover mechanism to change the direction of rotation to drive the vehicle in the reverse direction as well as in the forward direction. In this conventional system, the forward-reverse changeover mechanism is provided on the output side of the toroidal transmission. Therefore, a very heavy torque is applied to the forward-reverse changeover mechanism especially when the toroidal transmission is shifted toward a lower speed. The forward-reverse changeover mechanism of this conventional system therefore needs to have a large torque capacity and a large size. A similar arrangement is disclosed in Japanese Patent Provisional Publication No. 63-130954.

When, on the other hand, the forward-reverse changeover mechanism is provided on the input side of the toroidal transmission to reduce the size of the changeover mechanism (as shown in Japanese Patent Provisional Publication No. 62-255652), then there arises a need for changing the direction of inclination of the power rollers depending on the direction of rotation inputted to the input disc.

SUMMARY OF THE INVENTION

It is therefore an object of the present invention to provide a toroidal type transmission system which can control the amount of tilting of power rollers adequately whether the input rotation is in one direction or the other, and which is advantageous for size reduction.

According to the present invention, a toroidal type continuously variable transmission system comprises a toroidal type transmission mechanism, an actuating means, a first controlling means, a second controlling means, a reverse detecting means, and a selecting means.

The toroidal transmission mechanism comprises an input disc, an output disc, and a rolling member which is installed in a toroidal cavity formed between the input and output discs for torque transmission therebetween, and which is tiltable so as to continuously vary a speed ratio between rotational speeds of the output and input discs.

The actuating means is a means for inclining the rolling member of the transmission mechanism to continuously vary the speed ratio. The first and second controlling means are means for controlling the actuating means to control the speed ratio. The reverse detecting means is a means for detecting the direction of rotation inputted to the transmission mechanism. The selecting means is a means for selecting one of the first and second controlling means in dependence on the direction of rotation detected by the reverse detecting means.

The transmission system of the invention may further comprise an input drive means, drivingly connected with the input disc of the transmission mechanism. The input drive means comprises a forward-reverse changeover means for changing the direction of rotation inputted from the input drive means to the transmission mechanism, between a forward rotational direction and a reverse rotational direction. In this case, the reverse direction detecting means is in a reverse direction detection state when the rotation inputted to the transmission mechanism is in the reverse rotational direction. The selecting means selects the first controlling means when the reverse direction detecting means is out of the reverse detection state, and selects the second controlling means when the reverse direction detecting means is in the reverse direction detection state.

DETAILED DESCRIPTION OF THE INVENTION

Figure 1:
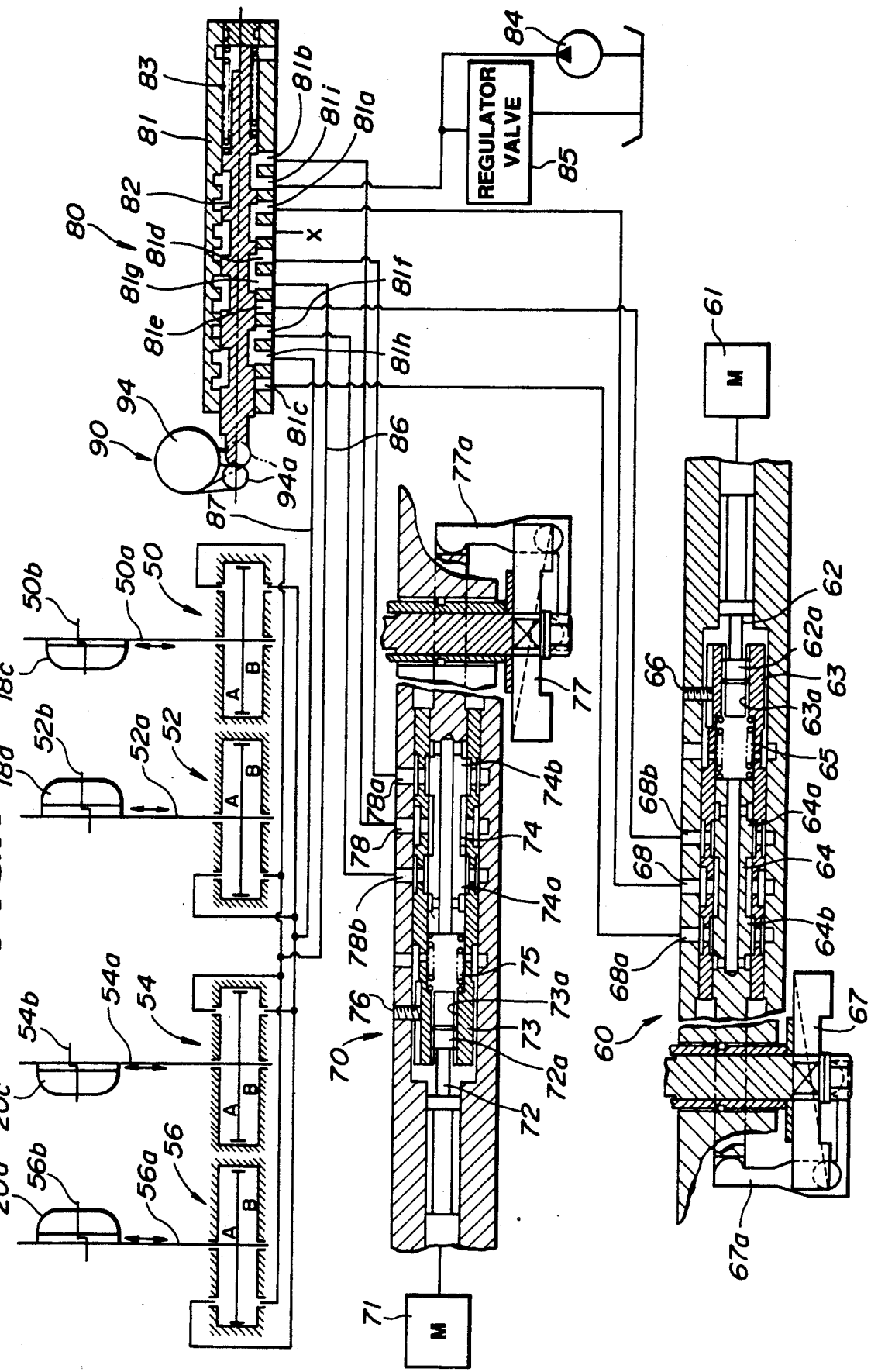
FIG. 1 is a schematic view showing a toroidal transmission system according to one embodiment of the present invention.
Figure 2:
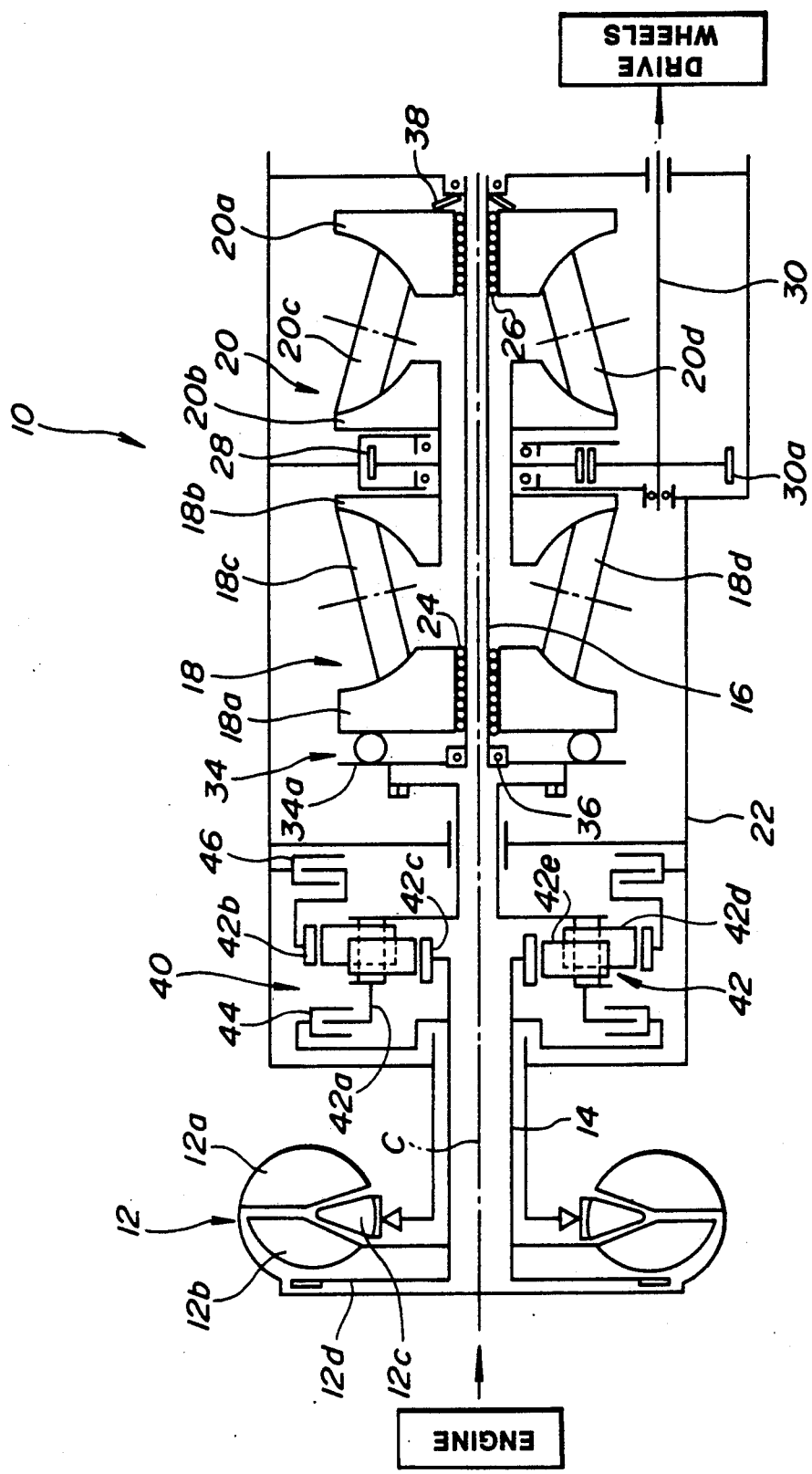
FIG. 2 is a schematic view showing a drive train according to the embodiment.
Figure 3:
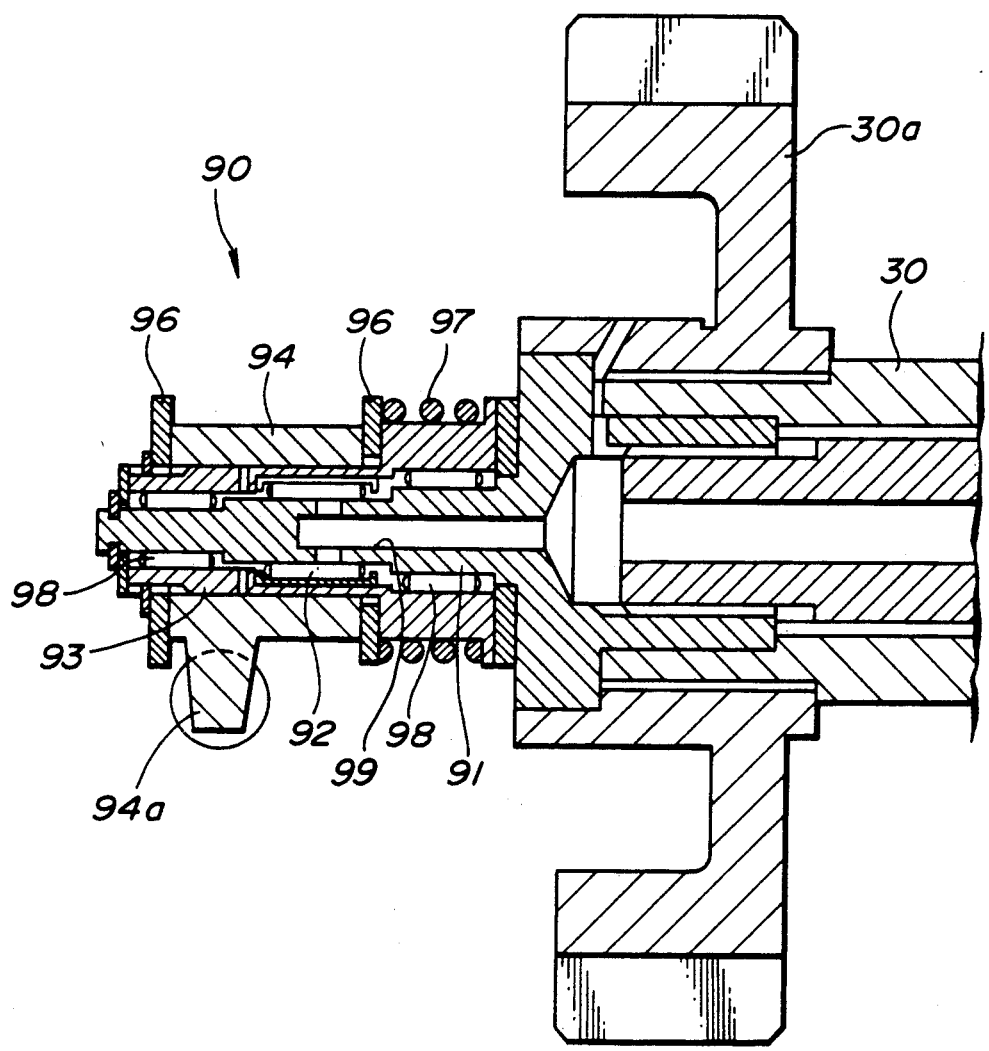
FIG. 3 is a sectional view showing a reverse detecting means of the embodiment.

A single embodiment of the present invention is shown in FIGS. 1, 2 and 3.

A transmission system of the embodiment includes a toroidal type continuously variable transmission (mechanism) 10, and a torque converter 12, as shown in FIG. 2. A power source such as an engine of a vehicle is provided on the left side of the torque converter 12, as viewed in FIG. 2, and drivingly connected with the torque converter 12. A torque of the power source is transmitted through the torque converter 12 to the toroidal type transmission 10.

The torque converter 12, as is well known, includes a pump impeller (power input member) 12a, a turbine runner (power output member) 12b, and a stator (reaction member) 12c. The torque converter 12 of this embodiment is of a known lockup type, and further includes a lockup clutch 12d for providing a direct mechanical drive. The torque converter 12 further has a torque converter output shaft 14.

The toroidal type continuously variable transmission (or transmission mechanism) 10 of the invention may have only a single drive path, or may have two or more parallel equal drive paths. In this embodiment, the toroidal transmission 10 has two parallel equal drive paths.

The toroidal transmission 10 of this embodiment has a center transmission shaft 16 which is in line with the torque converter output shaft 14, and first and second drive units 18 and 20 which are coaxially arranged around the center transmission shaft 16 in axially spaced relation with each other, so as to provide two parallel and equal drive paths. The center transmission shaft 16 is a hollow shaft, supported in such a manner that the center transmission shaft 16 is axially movable to a limited extent with respect to a transmission housing 22.

The first and second drive units 18 and 20 are substantially identical in construction and size with each other. Each drive unit 18 or 20 has an input disc 18a or 20a, an output disc 18b or 20b, and an intermediate rolling member for coupling the input and output discs for torque transmission from the input disc to the output disc. The input and output discs of each drive unit have confronting toroidal surfaces, and form a toroidal cavity therebetween. Each drive unit is a friction drive transmission, and the intermediate rolling member is a friction member which is in frictional contact with the both the input and output discs. In the toroidal cavity of each unit, the rolling member can incline or tilt so as to vary relative positions among the input and output discs and the rolling members relative to each other. The rolling member of each drive unit of this embodiment consists of two friction power rollers 18c and 18d or 20c and 20d.

The first drive unit 18 is mounted on a first half of the center transmission shaft 16 between a first end and a middle of the center transmission shaft 16. The second drive unit 20 is mounted on a second half of the center transmission shaft 16 between a second end and the middle of the center transmission shaft 16. In FIG. 2, the first end of the center shaft 16 is on the lefthand side, and the second end is on the righthand side. The first output disc 18b of the first unit 18 and the second output disc 20b of the second unit 20 are disposed axially between the first input disc 18a of the first unit 18 and the second input disc 20a of the second unit 20. Each of the first and second drive units 18 and 20 is arranged like a mirror image of the other. In this embodiment, the input discs 18a and 20a are outside discs, and the output discs 18b and 20b are inside discs.

The first and second input discs 18a and 20a are mounted on the center transmission shaft 16 through first and second coupling means 24 and 26, respectively, in such a manner as to prevent relative rotation between the center transmission shaft 16 and each input disc, and to permit relative axial movement between the center transmission shaft 16 and each input disc. In this embodiment, each of the first and second coupling means 24 and 26 comprises ball splines having splines and balls for making the axial movement between the coupled members smooth.

An output terminal member 28 is rotatably mounted on the center transmission shaft 16 through a suitable bearing means. The output terminal member 28 of this embodiment is an output gear. The first and second output discs 18b and 20b are splined to the output gear 28. The output gear 28 receives both the torque transmitted from the first input disc 18a to the first output disc 18b, and the torque transmitted from the second input disc 20a to the second output disc 20b. The torque of the output gear 28 is further transmitted through a gear 30a meshing with the output gear 28, and a counter shaft 30. The counter shaft 30 is drivingly connected through an appropriate drive line to a driven equipment which, in this embodiment, includes drive wheels of the vehicle. In this embodiment, the output drive path including the counter shaft 30 and the drive wheels serves as an output drive means.

The toroidal transmission 10 further includes a first loading means including a loading cam mechanism 34, and a second loading means including a disc spring 38. The loading cam mechanism 34 is mounted on the center transmission shaft 16 at the side of the first input disc 18a. The loading cam mechanism 34 is arranged to receive a torque of the power source through an input drive path serving as an input drive means, and produce an axial thrust load (force) in accordance with the input torque.

The loading cam mechanism 34 has a loading cam disc 34a which is rotatably mounted on the center transmission shaft 16 near the first lefthand end, and engaged with the center transmission shaft 16 through a thrust bearing 36 so that an axial force can be transmitted between the loading cam disc 34a and the center transmission shaft 16. The loading cam mechanism 34 further includes loading rollers compressed between the cam disc 34a and the first input disc 18a. When the input torque is applied to the loading cam disc 34a, the cam disc 34a rotates relative to the first input disc 18a. This relative rotation causes the cam mechanism 34 to compress the loading rollers between the cam disc 34a and the transmission therebetween, and to produce an axial force (thrust load) pushing the first input disc 18a toward the first output disc 18b, and an opposite axial force pushing an outward flange formed in the first end of the center transmission shaft 16 through the thrust bearing 36 in the opposite axial direction.

The disc spring (Bellevile spring) 38 of the second loading means is disposed between the second input disc 20a and an outward flange provided in the second righthand end of the center transmission shaft 16. The disc spring 38 applies an axial preload on the second input disc 20a and pushes the second input disc 20a toward the second output disc 20b.

In the toroidal transmission 10 of this embodiment, the axial thrust load produced by the loading cam mechanism 34 is applied on the first input disc 18a, and at the same time transmitted through the thrust bearing 36, the center transmission shaft 16, and the disc spring 38, to the second input disc 20a.

On the other hand, the axial preload produced by the disc spring 38 is applied on the second input disc 20a, and at the same time transmitted through the center transmission shaft 16, and the loading cam mechanism 34, to the first input disc 18a.

The transmission system of this embodiment further includes a forward-reverse changeover mechanism 40 for changing the direction of rotation between a forward rotational direction and a reverse rotational direction. The changeover mechanism 40 serves as a forward-reverse changeover means. In this embodiment, the rotation in the forward direction is used for driving the vehicle forwardly, and the rotation in the reverse direction is used for driving the vehicle backwardly. The forward-reverse changeover mechanism 40 is provided in the input drive path between the power source and the toroidal transmission 10. In this embodiment, the forward-reverse changeover mechanism 40 is disposed between the torque converter and the loading cam mechanism 34.

The forward-reverse changeover mechanism 40 of this embodiment includes a planetary gear set 42 of a double planet type (or a double pinion type), a forward clutch 44, and a reverse brake 46. The planetary gear set 42 includes a planet carrier 42a, a ring gear 42b, a sun gear 42c, and first and second planet pinions 42d and 42e which are in mesh with each other. The sun gear 42c is connected with the torque converter output shaft 14, and the carrier 42a is connected with the loading cam disc 34a. The first pinion 42d is in mesh with the ring gear 42b, and the second pinion 42e is in mesh with the first pinion 42d and the sun gear 42c. The forward clutch 44 is disposed between the torque converter output shaft 14 and the carrier 42a, and designed to connect and disconnect the carrier 42a with and from the converter output shaft 14. The reverse brake 46 is disposed between the ring gear 42b and the housing 22, and designed to connect and disconnect the ring gear 42b with and from the housing 22.

When the forward-reverse changeover mechanism 40 is in a forward drive state in which the forward clutch 44 is engaged, and the reverse brake 46 is released, then the output rotation of the changeover mechanism 40 is in the forward rotational direction which is the same as the rotational direction of the power output of the power source, that is, the engine of the vehicle. When the changeover mechanism 40 is in a reverse direction drive state in which the forward clutch 44 is released, and the reverse brake 46 is engaged, then the output rotation of the changeover mechanism 40 is in the reverse direction which is opposite to the rotational direction of the power source. The output rotation of the changeover mechanism 40 in the forward or reverse direction is transmitted from the changeover mechanism 40 to the loading cam mechanism 34 of the toroidal transmission 10.

The two power rollers 18c and 18d or 20c and 20d of each drive unit 18 or 20 are arranged symmetrically with respect to the center axis C of the center transmission shaft 16. There is provided a shift control system for controlling the power rollers. The shift control system inclines the power rollers of each drive unit in accordance with an operating condition such as a vehicle operating condition, as disclosed in Japanese Utility Model Provisional Publication No. 63-92859, and continuously varies a transmission ratio which is a ratio between rotational speeds of the output and input discs by varying the relative positions among the input and output discs and the power rollers.

As schematically shown in FIG. 1, the shift control system of the embodiment comprises four hydraulic actuators 50, 52, 54 and 56 serving as an actuating means for inclining the rolling members. The power rollers 18c, 18d, 20c and 20d are connected, respectively, with the actuators 50, 52, 54 and 56 through rotating shafts 50a, 52a, 54a and 56a, and eccentric shafts 50b, 52b, 54b and 56b. Each power roller 18c, 18d, 20c or 20d is rotatably supported through the eccentric shaft 50b, 52b, 54b or 56b, on the rotating shaft 50a, 52a, 54a or 56a which is axially moved by the actuator 50, 52, 54 or 56. Each actuator 50, 52, 54 or 56 is capable of inclining the associated power roller 18c, 18d, 20c or 20d by causing the associated rotating shaft 50a, 52a, 54a or 56a to move up and down as viewed in FIG. 1. Each of the rotating shafts 50a, 52a, 54a and 56a rotates when moved up and down by the associated actuator to incline the power roller. Therefore, the angle of inclination of each power roller is determined by the displacement of the associated actuator, or the angular displacement of the associated rotating shaft which is rotated in accordance with the up and down movement.

The shift control system of this embodiment further comprises a first control valve 60 serving as a first controlling means and a first control valve means, a second control valve 70 serving as a second controlling means and a second control valve means, and a selector valve 80 serving as a selecting means and a selector valve means. The first control valve 60 is used for the forward operation, and the second control valve 70 is for the reverse operation. The selector valve 80 is capable of selecting either of the first and second control valves 60 and 70.

The first and second control valves 60 and 70 of this embodiment are identical in construction to each other, but the second control valve 70 is reversed as shown in FIG. 1. Each of the first and second control valve 60 and 70 has a step (stepping) motor 61 or 71, a drive rod 62 or 72 rotated by the motor 61 or 71, a sleeve 63 or 73, a spool 64 or 74 received in a bore of the sleeve 63 or 73, and a spring 65 or 75 for pushing the spool 64 or 74 in an axial direction away from the step motor 61 or 71. As shown in FIG. 1, the step motor 71 is on the left side while the step motor 51 is on the right side.

The drive rod 62 or 72 of each control valve 60 or 70 has an externally threaded end portion 62a or 72a, which is screwed in an internally threaded hole 63a or 73a of the sleeve 63 or 73. The sleeve 63 or 73 of each control valve has an axially extending groove formed in an outer circumferential surface, and a pin 66 or 76 is received in the axial groove of the sleeve 63 or 73, so that the sleeve 63 or 73 of each valve is axially slidable without being rotated.

In each of the first and second control valves 60 and 70, a feedback arrangement is connected with a second end of the spool 64 or 74 whose first end opposite to the second end is pushed by the spring 65 or 75. The feedback arrangement of the first control valve 60 is on the left side as viewed in FIG. 1, and the feedback arrangement of the second control valve 70 is on the right side. The feedback arrangement of each control valve has a precess cam 67 or 77, and a link 67a or 77a, and is arranged to convert a rotational displacement of one of the rotating shafts 50a, 52a, 54a and 56a, into an axial displacement, through the precess cam and the link, and to feed back this axial displacement to the control valve 60 or 70. The amount of rotation (angular displacement) of each of the rotating shafts 50a, 52a, 54a and 56a is proportional to the amount of inclination of the associated power roller 18c, 18d, 20c or 20d. Therefore, it is possible to feed back the amount of inclination of the power roller by feeding back the amount of rotation of the rotating shaft. Similar precess cam arrangements are disclosed in a U.S. Pat. No. 4,434,675 and the copending U.S. patent application Ser. No. 07/352,309. The explanation about the precess cam of these documents are herein incorporated by reference.

It is possible to connect the precess cams 67 and 77, respectively, to the two different rotating shafts, or to connect both precess cams 67 and 77 to one and the same rotating shaft.

The spool 64 or 74 of each control valve 60 or 70 has a first land 64a or 74a and a second or 74b, which act to distribute a line pressure introduced through an input port 68 or 78 formed in a valve body, between first and second control ports 68a and 68b or 78a and 78b of the valve body, in accordance with the movement of the spool 64 or 74. FIG. 1 shows the spools 64 and 74 in a stable state in which the line pressure is equally distributed between the first and second control ports. In each control valve, the input port 68 or 78 is located axially between the first and second control ports 68a and 68b or 78a and 78b.

The selector valve 80 has a spool 82 (movable means of the selector valve means) slidably received in a valve body 81. A spring 83 is disposed between a first end of the spool 82 and the valve body 81, and arranged to push the spool 82 leftwardly as viewed in FIG. 1. A second end of the spool 82 is arranged to receive a switch signal from a reverse detecting means 90.

The valve body 81 of the selector valve 80 has a forward supply port 81a connected with the input port 68 of the first control valve 60, a reverse supply port 81b connected with the input port 78 of the second control valve 70, a first forward control port 81c connected with the first control port 68a of the first control valve 60, a first reverse control port 81d connected with the first control port 78a of the second control port 70, a second forward control port 81e connected with the second control port 68b of the first control valve 60, and a second reverse control port 81f connected with the second control port 78b of the second control valve 70. The valve body 81 further has a first common control port 81h, a second common control port 81g, and a common line pressure port 81i. The first and second common control ports 81h and 81g are connected with the actuators 50, 52, 54 and 56. The common line pressure port 81i is connected with a fluid pressure source comprising an oil pressure pump 84 and a regulator valve 85. The regulator valve 85 produces the line pressure by regulating the output fluid pressure of the oil pump 84, and the line pressure is supplied to the common line pressure port 81i.

Each hydraulic actuator 50, 52, 54 or 56 has an upper fluid pressure chamber A, and a lower fluid pressure chamber B, which are separated by a piston. When a higher fluid pressure is supplied to the upper chamber A, then each actuator causes the corresponding rotating shaft to move downwardly in FIG. 1. When the pressure supplied to the lower chamber B is higher than the pressure of the upper chamber A, then each actuator moves the corresponding rotating shaft upwardly in FIG. 1.

Between the actuators 50 and 52 for the first drive unit 18, the upper chamber A of the first actuator 50 is connected with the lower chamber B of the second actuator 52, and the lower chamber B of the first actuator 50 is connected with the upper chamber A of the second actuator 52. Therefore, the actuators 50 and 52 are operated in the opposite directions. Between the actuators 54 and 56 for the second drive unit 20, the fluid chambers are connected with one another in the same diagonal manner, so that the actuators 54 and 56 are operated in the opposite directions.

The upper chamber A of the actuators 50 and 54, and the lower chambers B of the actuators 52 and 56 are all connected through a second circuit 86 to the second common control port 81g of the selector valve 80. On the other hand, a first circuit 87 connects the lower chambers B of the actuators 50 and 54, and the upper chambers A of the actuators 52 and 56 to the first common control port 81h of the selector valve 80. Thus, each actuator has a first (upper or lower) pressure chamber connected with the first common control port 81h through the first circuit 87, and a second pressure chamber connected with the second common control port 81g through the second circuit 86.

The spool 82 of the selector valve 80 assumes a forward (first) select position or a reverse (second) select position. In FIG. 1, an upper half of the spool 82 shows the forward select position, and a lower half the reverse select position.

When the spool 82 is in the forward (first) select position, the selector valve 80 connects the common line pressure port 81i to the forward supply port 81a, the second common control port 81g to the second forward control port 81e, and the first common control port 81h to the first forward control branch port 81c. Therefore, the line pressure is supplied to the input port 68 of the first control valve 60 through the ports 81i and 81a of the selector valve 80, and the first control valve 60 supplies a first control fluid pressure from the first control port 68a to the actuators 50, 52, 54 and 56 through the ports 81c and 81h of the selector valve 80, and the second circuit 87, and a second control fluid pressure from the second control port 68b to the actuators 50, 52, 54 and 56, through the ports 81g and 81e of the selector valve 80, and the first circuit 86. I the forward select position, the selector valve 80 shuts off all the ports 81b, 81d and 81f which are connected with the second valve 70. In the forward select position, the selector valve 80 permits the first control valve 60 to control the actuators by connecting the first control valve 60 with the actuators, and disables the second control valve 70 by disconnecting the second control valve 70 from the actuators.

When the spool 82 is in the reverse select position shown by the lower half of the spool 82 in FIG. 1, then the ports 81b, 81d and 81f are connected, respectively, with the common ports 81i, 81g and 81h. Therefore, the selector valve 80 introduces the line pressure to the input port 78 of the second control valve 70 by the connection between the ports 81i and 81b, and allows the second control valve 70 to supply a first control fluid pressure from the first control port 78a to the second circuit 86 through the ports 81d and 81g, and a second control fluid pressure from the second control port 78b to the first circuit 87 through the ports 81a, 81c and 81e for the first control valve 60. The selector valve 80 in the reverse operating position disconnects the first control valve 60 from the actuators, and instead connects the second control valve 70 with the actuators and the fluid pressure source. In this way, the selector valve 80 has the three common ports 81g, 81h and 81i, a first alternative group of the ports 81a, 81c and 81e, and a second alternative group of the ports 81b, 81d and 81f. The common port 81i is formed between the ports 81a and 81b. The common port 81h is between the ports 81c and 81f. The common port 81g is between the ports 81d and 81e.

The reverse direction detecting means 90 of this embodiment is shown in FIG. 3. The reverse direction detecting means 90 of this embodiment is a mechanical means provided at one end of the counter shaft 30 shown in FIG. 2, and arranged to detect the rotational direction of the counter shaft 30 to discriminate between the forward and reverse operations.

As shown in FIG. 3, the reverse direction detecting mechanism 90 has a support shaft 91 which is coupled end to end with the counter shaft 30 in alignment with each other, a one-way clutch 92, an intermediate collar 93 which is mounted on the support shaft 91 through the one-way clutch 92, and a pushing collar 94 rotatably mounted on the intermediate collar 93. The reverse detecting mechanism 90 further includes two friction plates 96 and a spring 97. The friction plates 96 are mounted on the intermediate collar 93 and coupled with the intermediate collar 93 by means of serration. The pushing collar 94 is pressed between the two friction plates 96. The spring 97 is so disposed as to apply a biasing force to one of the friction plates 96, and to compress the pushing collar 94 between the friction plates 96.

The pushing collar 94 has a pushing arm 94a projecting radially outwardly, and having an end abutting on the end of the spool 82 of the selector valve 80. The one-way clutch 92 is at an idle state to permit free rotation when the rotation of the counter shaft 30 is in the forward direction corresponding to the forward operation of the vehicle, and at a lock state when the rotation of the counter shaft 30 is in the reverse direction corresponding to the backward operation of the vehicle. There are further provided needle bearings 98, and an oil passage 99 for supplying a lubricating oil to the one-way clutch 92.

When the counter shaft 30 is rotating in the forward direction, the one-way clutch 92 is idling without transmitting torque to the pushing collar 94. In the selector valve 80, therefore, the spool 82 is held at the forward (first) select position shown by the upper half of the spool 82 in FIG. 1 by the biasing force of the spring 83. When the counter shaft 30 is rotating in the reverse direction, the one-way clutch 92 is locked, and transmits torque from the counter shaft 30 to the pushing collar 94. This state is a reverse direction detection state of the reverse direction detecting means 90. Therefore, the arm 94a of the pushing collar 94 pushes the spool 82 of the selector valve 80, and brings the spool 82 to the reverse (second) select position shown by the lower half of the spool 82 in FIG. 1. After the reverse (second) select position is reached, the pushing collar 94 rotates relative to the intermediate collar 93, overcoming the frictional forces of the friction plates 96.

The thus-constructed toroidal type continuously variable transmission system of this embodiment is operated as follows:

A torque is transmitted from the engine, through the torque converter 12 and the forward-reverse changeover mechanism 40, to the loading cam mechanism 34 of the toroidal transmission 10. In the transmission 10, the first and second drive units 18 and 20 transmit the torque inputted to the loading cam mechanism 34 to the output gear 28 while controlling the transmission ratio. The torque of the output gear 28 is further transmitted through the gear 30a, and the counter shaft 30 to the drive wheels of the vehicle.

When the forward-reverse changeover mechanism 40 is in the forward drive state in which the forward clutch 44 is engaged and the reverse brake 46 is released, then the input rotation inputted to the first and second input discs 18a and 20a is in the same direction as the engine rotation. The input discs 18a and 20a rotating in the forward direction drive the output disc 18b and 20b in the opposite direction through the power rollers, and the oppositely rotating output discs 18b and 20b drive the counter shaft 30 in the same forward direction through the output gear 28 and the gear 30a of the counter shaft 30. Then, the forward rotation of the counter shaft 30 is transmitted to the drive wheels of the vehicle to drive the vehicle forwardly.

When the forward-reverse changeover mechanism 40 is in the reverse drive state in which the reverse brake 46 is engaged, and the forward clutch 44 is released, the input discs 18a and 20a and the counter shaft 30 are driven in the reverse direction opposite to the rotational direction of the engine, while the output discs 18b and 20b are driven in the opposite direction. The reverse rotation of the counter shaft 30 is transmitted to the drive wheel, and the vehicle is driven backwards.

When the rotation of the counter shaft 30 is forward, the one-way clutch 92 of the reverse detecting means 90 is in the idle state, and the spool 82 of the selector valve 80 is in the forward (first) select position In this position, the selector valve 80 shuts off the ports 81b, 81d and 81f (of the second alternative group) leading to the second control valve 70, and makes the connections to the ports 81a, 81e and 81c 81e of the first alternative group leading to the first control valve 60. Therefore, the line pressure produced by the oil pressure pump 84 and the regulator valve 85 is introduced to the input port 68 of the first control valve 60.

In the first control valve 60, the step motor 61 is driven by a control signal which is produced by a shift control unit (not shown) in accordance with a vehicle operating condition, and the position of the spool 64 is determined by the amount of rotation of the step motor 61, and the feedback amount returned through the precess cam 67 from the power roller. In accordance with the position of the spool 64, the first control valve 60 produces a first control fluid pressure at the first control port 68a, and a second control fluid pressure at the second control port 68b, and delivers the first and second control pressures to the hydraulic actuators 50, 52, 54 and 56 to achieve the desired transmission ratio.

When the vehicle is in the reverse operation, the one-way clutch 92 of the reverse detecting mechanism 90 is locked, and the pushing collar 94 sets the selector valve 80 to the reverse (second) select position. In this position, the selector valve 80 shuts off the ports 81a, 81e and 81c (of the first alternative group) for the first control valve 60, and opens the ports 81b, 81d and 81f (of the second alternative group) for the second control valve 70. Therefore, the line pressure is supplied only to the second control valve 70. Like the first control valve 60, the second control valve 70 produces first and second control pressures at the first and second control ports 78a and 78b in accordance with the position of the spool 74 which is moved by the step motor 71 and the precess cam 77, and delivers the first and second control fluid pressures to the actuators 50, 52, 54 and 56. In accordance with the control pressures of the second control valve 70, the actuators 50, 52, 54 and 56 incline the power rollers to achieve the desired transmission ratio.

In this embodiment, the whole of the second control valve 70 inclusive of the precess cam 77 is placed oppositely with respect to the first control valve 60 and the precess cam 67. Therefore, the feedback amount inputted to the first control valve 60 from the precess cam 67, and the feedback amount inputted to the second control valve 70 from the precess cam 77 are correctly adapted to the forward and reverse operations.

The reverse direction detecting means 90 of the illustrated embodiment is arranged to detect the rotational direction of the counter shaft 30. However, it is possible to arrange the detecting means 90 to detect the rotational direction of any rotating member in the drive path between the output side of the forward-reverse changeover mechanism 40 and the drive wheels of the vehicle. Furthermore, the reverse direction detecting means 90 may be a detecting means for electrically detecting the rotational direction by using magnetic pulses, or may be a position sensor for detecting the position of an appropriate element of the forward-reverse changeover mechanism 40, or the position of a driver's control lever. In such a case, a solenoid or a hydraulic actuator is provided to control the position of the spool 82 of the selector valve 80 in response to the output signal of the detecting means 90.

The toroidal transmission 10 of the illustrated embodiment has two drive units. However, the transmission of the invention may have only one drive unit, or may have three or more drive units.

What is claimed is:

1. A toroidal type continuously variable transmission system comprising;
   a toroidal type transmission mechanism comprising an input disc, an output disc and a rolling member which is installed in a toroidal cavity formed between said input and output discs,
   actuating means for tilting said rolling member to continuously vary a speed ratio between rotational speeds of said output and input discs,
   first and second controlling means for controlling said actuating means to control said speed ratio,
   reverse direction detecting means for detecting the direction of rotation inputted to said transmission mechanism, and
   selecting means for selecting one of said first and second controlling means in dependence on the direction of rotation detected by said reverse direction detecting means.

2. A transmission system according to claim 1 wherein said system further comprises input drive means, drivingly connected with said input disc of said transmission mechanism, for inputting torque to said transmission mechanism, said input drive means comprising forward-reverse changeover means for changing the direction of rotation inputted from said input drive means to said transmission mechanism, between a forward rotational direction and a reverse rotational direction.

3. A transmission system according to claim 2 wherein said actuating means comprises a hydraulic actuator, said first controlling means comprises first control valve means for varying a fluid pressure supplied to said actuating means, said second controlling means comprises second control valve means for varying a fluid pressure supplied to said actuating means, and said selecting means comprises selector valve means which connects said first control valve means with said actuating means and disconnects said second control valve means from said actuating means when the rotation inputted to said transmission mechanism is in said forward rotational direction, and which connects said second control valve means with said actuating means and disconnects said first control valve means from said actuating means when the rotation inputted to said transmission mechanism is in the reverse directional rotation.

4. The transmission system according to claim 3 wherein said actuating means comprises a first fluid pressure chamber for actuating said rolling member of said transmission mechanism in one direction and a second fluid pressure chamber for actuating said rolling member in the opposite direction, each of said first and second control valve means comprises a first control port and a second control port, and said selector valve means is capable of assuming a first select position in which said selector valve means makes a fluid connection between said first control port of said first control valve means and said first pressure chamber of said actuating means, and a fluid connection between said second control port of said first control valve means and said second pressure chamber of said actuating means, and a second select position in which said selector valve means makes a fluid connection between said first control port of said second control valve and said second pressure chamber, and a fluid connection between said second control port of said second control valve means and said first pressure chamber.

5. A transmission system according to claim 4 wherein said selector valve means comprises a first common control port connected with said first pressure chamber of said actuating means, a second common control port connected with said second pressure chamber of said actuating means, a first alternative group of ports including a first forward control port connected with said first control port of said first control valve means, and a second forward control port connected with said second control port of said first control valve means, a second alternative group of ports including a first reverse control port connected with said first control port of said second control valve means, and a second reverse control port connected with said second control port of said second control valve means, and movable means which connects said first common control port with said first forward control port and said second common control port with said second forward control port when said selector valve means in said first select position, and which connects said first common control port with said second reverse control port and said second common control port with said first reverse control port when said selector valve means in said second select position.

6. A transmission system according to claim 5 wherein said transmission system further comprises a pressure source for producing a line fluid pressure, each of said first and second control valve means further comprises an input port and said selector valve means further comprises a line pressure port connected with said pressure source for receiving said line pressure, a forward supply port connected with said input port of said first control valve means, and a reverse supply port connected with said input port of said second control valve means, said selector valve means connecting said line pressure port with said forward supply port to supply said line pressure to said first control valve means in said first select position, and connecting said line pressure port with said reverse supply port to supply said line pressure to said second control valve means in said second select position.

7. A transmission system according to claim 6 wherein said first control valve means comprises a first control valve, and said second control valve means comprises a second control valve which is substantially identical in construction to said first control valve.

8. A transmission system according to claim 7 wherein said transmission system is mounted on a vehicle, and further includes output drive means for transmitting torque from said output disc of said transmission mechanism, to drive wheels of the vehicle, and wherein said input drive means further comprises a torque converter which is drivingly connected with an engine of the vehicle, said forward-reverse changeover means being disposed between said torque converter and said transmission mechanism.

* * * * *